United States Patent [19]
Carroll

[11] Patent Number: 5,847,543
[45] Date of Patent: Dec. 8, 1998

[54] AC ADAPTER WITH AUTOMATICALLY OPTIMIZED OUTPUT VOLTAGE AND POWER

[75] Inventor: Barry N. Carroll, The Woodlands, Tex.

[73] Assignee: Compaq Computer Corporation, Houston, Tex.

[21] Appl. No.: 885,021

[22] Filed: Jun. 30, 1997

[51] Int. Cl.$^6$ .......................... H01M 10/44; H01M 10/46
[52] U.S. Cl. .......................................................... 320/125
[58] Field of Search .................................. 320/106, 110, 320/116, 128, 137, 140, 125, 158, 163, DIG. 10, 105, 114, 121, 148, 155

[56] References Cited

U.S. PATENT DOCUMENTS

| | | |
|---|---|---|
| 4,933,829 | 6/1990 | White . |
| 5,355,073 | 10/1994 | Nguyen ................................... 320/116 |
| 5,377,091 | 12/1994 | Faulk . |
| 5,382,893 | 1/1995 | Dehnel . |
| 5,402,055 | 3/1995 | Nguyen . |
| 5,640,312 | 6/1997 | Carroll . |

*Primary Examiner*—Edward H. Tso
*Attorney, Agent, or Firm*—Matthew S. Anderson

[57] ABSTRACT

A portable docking and precharging station with an AC adapter with automatically optimized output voltage and power. An IIC communications link between the computer and AC adapter carries signals which adjust the AC adapter's voltage and power settings, depending on the charge state of the battery and whether the computer is on or off. If the computer is on, full output power is provided from the AC adapter. If the computer is off, the output power from the AC adapter is reduced so that the current cannot exceed the battery manufacturer's recommended charging rates. Preferably the regulated output voltage and the current limit are both changed when the change between modes occurs.

35 Claims, 7 Drawing Sheets

AC ADAPTER WITH AUTOMATICALLY OPTIMIZED OUTPUT VOLTAGE AND POWER

BACKGROUND AND SUMMARY OF THE INVENTION

This invention relates to a portable computer docking and recharging station which provides power, from an AC mains supply, to power the computer's operation, recharge its battery, or both.

BACKGROUND

AC adapters for portable computers not only provide an alternate to battery power, but charge the computer batteries while the computer is on or off. One power architecture (termed "Constant Power") allows a fast charging of the computer battery even while the computer is on. (See U.S. Pat. No. 5,382,893, which is hereby incorporated by reference.) In this architecture the AC adapter provides constant power throughout the fast charging cycle of the battery. (If the computer is on, it will consume the power that it requires to operate, and the battery receives the remaining power from the AC adapter; if the computer is off, the battery can use the AC adapter's full output power capability for fast charging.) With a discharged battery (low cell voltage), the AC adapter voltage will be clamped by the charging circuitry inside the battery enclosure to a voltage slightly higher than the cell voltage as current from the adapter charges the battery. As the battery is charging, the battery voltage increases and the charging current decreases. The battery charging current is equal to the available output power divided by the battery voltage. At a level determined by the battery charging circuitry, depending on battery voltage and temperature, the charging will terminate.

As portable computers' capabilities have increased, the power requirements to operate them have increased. As a result, the constant power charging scheme has presented a problem. In the U.S., smart battery chargers have been in use in docking stations for some time, but with mixed success and added expense. While the computer is off, the battery charging current from the higher power AC adapter may exceed the battery manufacturer's recommended charging rates. Prolonged exposure to high charge current rates will significantly shorten the life of the battery. The problem becomes a question of how to provide adequate power to operate the portable computer and its peripherals while not exceeding the battery charging current.

SUMMARY OF THE INVENTION

The present application discloses systems and methods for computer and/or docking station operation using a new approach for optimizing power conversion. The power conversion parameters are automatically adjusted in dependence on the load requirements.

When the computer is on, the AC adapter provides full output power to operate the computer (and charge the battery if needed). When the computer is off, the output power from the AC adapter is reduced, so that the current to the battery cannot exceed the battery's maximum charging rate. Preferably at least one output voltage is also varied, to optimize the output voltage for the specific needs of battery charging. Thus the AC adapter has two high-power operating modes, neither of which is a sleep mode.

This is implemented by an additional communications link between the computer and the AC adapter (an IIC bus, in the presently preferred embodiment). Through this link the computer sends signals to a microcontroller (an 8051 in this embodiment) whereby the microcontroller adjusts the AC adapter's source impedance depending upon whether the computer is on or off, and depending on the charge state of the battery. The AC adapter interprets these signals and adjusts its source impedance accordingly during battery charging. The signal receiving device in the presently preferred embodiment is a digitally controlled dual potentiometer in the regulator circuitry (one side of the potentiometer is used for output voltage adjustment and the other is used for output maximum-current adjustment). This approach provides power control without requiring an additional stage as in smart battery chargers.

These new solutions allow substantial flexibility for present and future portable products. Several of the new battery technologies are allowing less and less charging current. This invention enables the use of a high power AC adapter for power demanding portables while providing a variable charging current for the various new battery technologies.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit ANY of the various claimed inventions. Moreover, some statements may apply to some inventive features but not to others.

A sample hardware configuration will first be generally described, the steps of a sample method will then be described with reference to FIG. 3, and further details of a sample implementation will then be described with reference to FIGS. 2A, 2B, 5A, 5B, and 5C.

Sample Docking Station Embodiment

Figure 1:
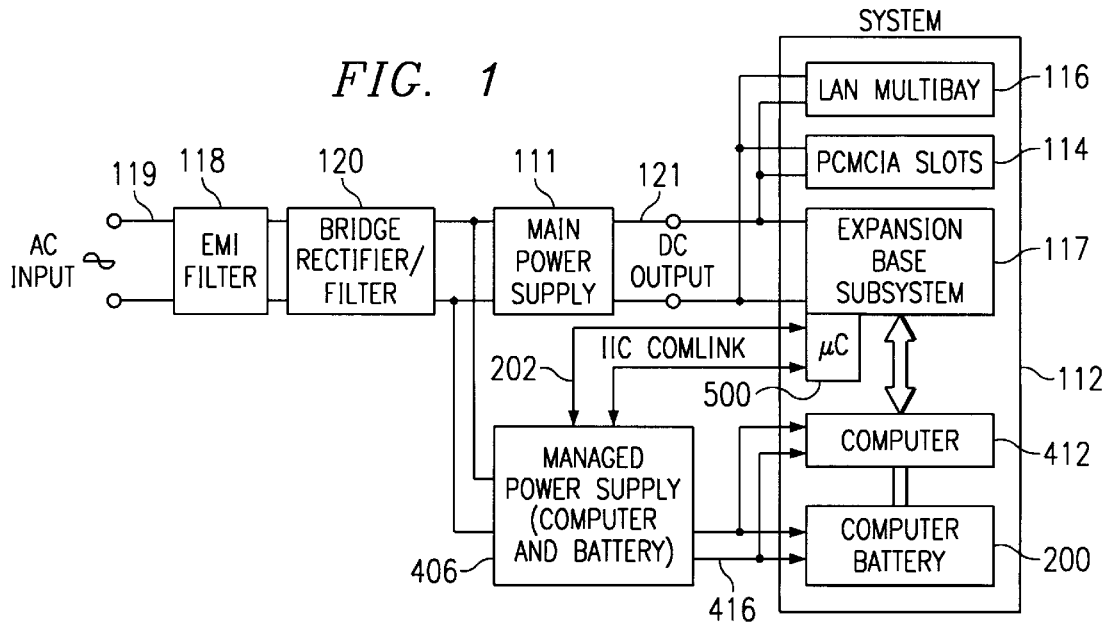
FIG. 1 shows a block diagram of a computer system connected to a main power supply and managed power supply in accordance with teachings of the present invention.

FIG. 1 is a block diagram which depicts the overall architecture of a sample docking station embodiment. A main power supply 111 receives power as input from an AC main source to AC input lines 119, and as filtered through an electromagnetic interference filter ("EMI") 118 and as rectified through a bridge rectifier/filter 120. EMI filter 118 and bridge rectifier circuit 120 remove high frequency noise and rectify input AC power to a high voltage DC power, respectively. Power supply 111 provides DC voltage at DC output lines 121 to the system 112. Numerous subsystems may be designed into the expansion base subsystem 117. In this particular representation, the subsystems of system 112 that receive power output from the main power supply 111 are a LAN multibay subsystem 116, a PCMCIA slot subsystem 114, and an expansion base subsystem 117. A managed power supply 406 is coupled to the expansion base subsystem 117 by way of a IIC communication link 202. The IIC communication link 202 carries signals between a microcontroller 500 and managed power supply 406 whereby the output voltage and output power delivered from the managed power supply 406 at DC output lines 416 is properly adjusted.

The level of output power and voltage supplied to energy-demanding devices is dependent on whether system 112 is powered on or off, has a computer 412 connected or not connected, and the charge state of the computer battery 200. When a computer 412 is docked and connected in the expansion base subsystem 117 it obtains numerous benefits which it may not have when not docked and connected. For example, including, but not limited to, network connectivity via the LAN multibay 116 and additional I/O connections such as PCMCIA slots 114. The computer battery 200 located within the computer 412 provides power to the computer 412 when not connected to the expansion base subsystem 117. When the computer 412 is docked and connected the computer battery 200 receives charging power over the DC output lines 416 at a controlled rate and predetermined amount so as to not exceed manufacturer's charging specifications for that particular model of battery.

Flowchart

Figure 3:
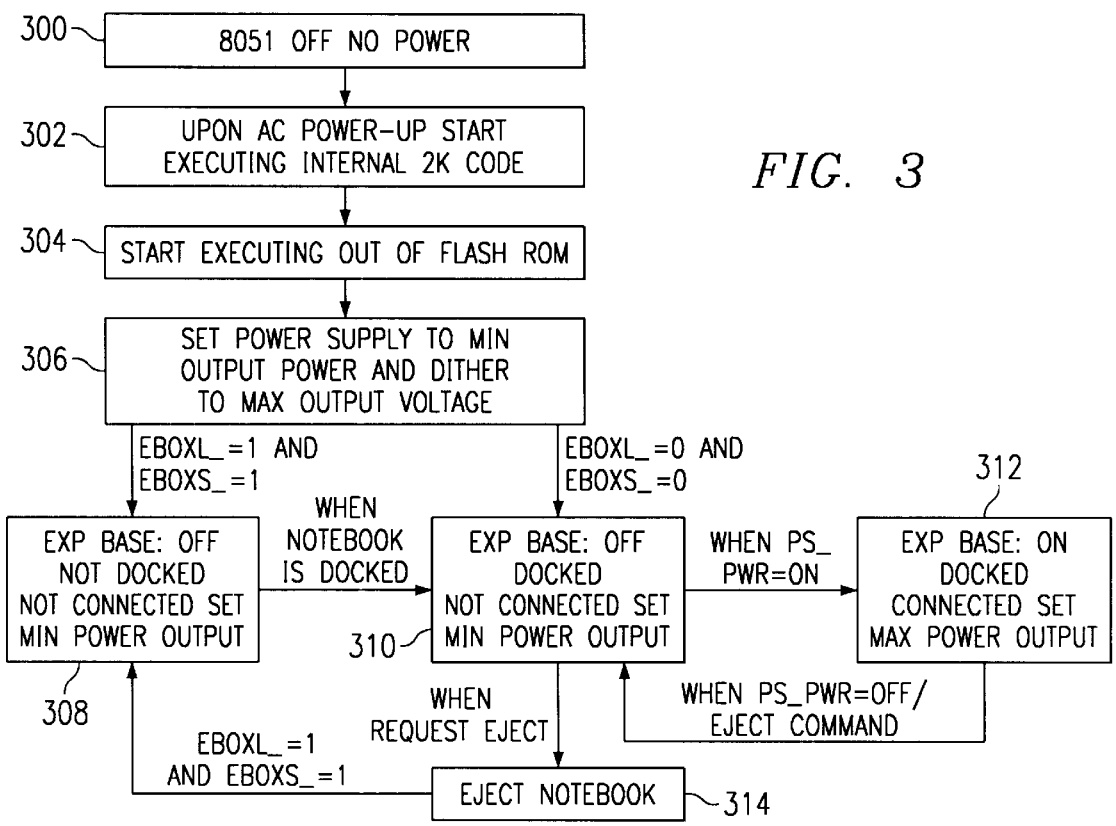
FIG. 3 shows a flowchart of program execution by the microcontroller with respect to control of the managed power supply.

FIG. 3 shows a flowchart for program flow between a microcontroller 500 (an 8051, in this example) and a managed power supply 406. A computer 412 (notebook or laptop variety) is used in this discussion with an expansion base subsystem 117 to which the computer 412 connects when docked. In state 300, the microcontroller is in an off state. In state 302, the microcontroller 500 is powered up and begins executing internal code. At completion of executing internal code in state 302, microcontroller 500 then executes code from read-only memory ("ROM") as indicated in state 304. In state 306, commands from the microcontroller 500 are sent to the managed power supply 406 to compensate for power requirements of computer battery 200. If expansion base subsystem 117 is powered off and the computer 412 is not docked or connected to the expansion base subsystem 117, program flow moves to state 308. The microcontroller 500 adjusts output power to a minimum since no power consuming device requires more than nominal power at the expansion base subsystem 117. When the computer 412 is docked in system 112, but not connected, program control moves to state 310. State 310 arises when a computer 412 is docked, not connected, and the expansion bay subsystem 117 is powered off. Again, since power required at the docking station is minimal, the microcontroller 500 maintains minimum power output to the expansion base subsystem 117. The next scenario is where the computer 412 is docked, connected, and the expansion base subsystem 117 is powered on. Program flow moves to state 312. A control loop is executed whereby power is supplied at maximum level until charging requirements are met. If the microcontroller 500 receives an eject command, program flow moves to state 314, power supply operations are terminated and the computer 412 is ejected. Program flow moves back to state 308 where the microcontroller 500 signals that output power be reset to a minimum.

Figure 2A:
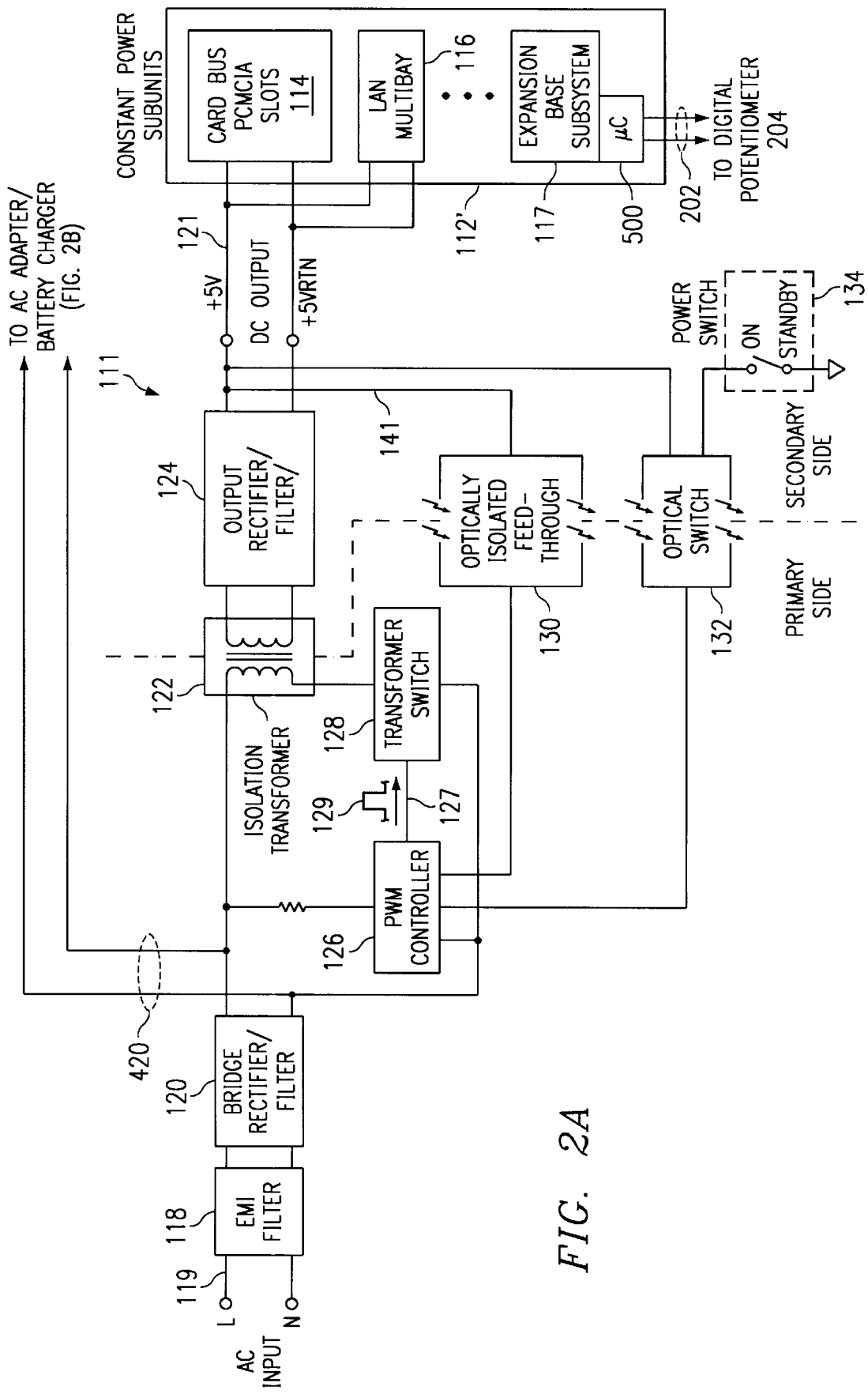
FIG. 2A shows a main power supply with standard switched standby control, connection to the innovative managed power supply, and interfacing to expansion bay subunits requiring constant power.

FIG. 2A shows in greater detail the main power supply system of FIG. 1. This implementation, for example, is in conjunction with a notebook or laptop computer docking station which includes both a conventional main power supply 111 and a managed power supply 406.

As illustrated in FIG. 2A, the main power supply 111 includes an isolation transformer 122 with a primary side coupled by an AC input line 119 to an AC power source. The secondary side is coupled to various energy-demanding components of a constant power subunit 112' (part of system 112) for supplying low voltage power.

Main power supply 111 connects to an EMI filter 118 coupled to AC input line 119, for removing high frequency noise generated by the main power supply 111. The output of EMI filter 118 is coupled to a bridge rectifier/filter circuit 120, which provides full-wave-rectified power to the primary side of isolation transformer 122. In this sample embodiment, the rectified AC power undergoes a 120:6 step down. Additionally, the output of the bridge rectifier/filter 120 is connected to the managed power supply system 406 over lines 420.

The secondary side of transformer 122 is coupled to an output rectifier/filter/charging circuit 124 where the rectified, stepped-down AC power output from the secondary side of isolation transformer 122 is converted into a low voltage DC power. For ease of illustration, DC output lines 121 comprise a single +5 VDC output line and a corresponding return line ("+5 VRTN"). However, in practice the main power supply 111 can include other DC outputs, e.g. +3.3 volt and +12 volt lines. Furthermore, while FIG. 2A illustrates a PCMCIA slot subsystem 114 and LAN multibay subsystem 116 as the energy demanding components of subunit 112' which are coupled to DC output lines 121 of main power supply 111, it is further contemplated that additional energy demanding components (not shown in FIG. 2A) may be coupled to the DC output lines 121.

The expansion base subsystem 117 also draws power from the main power supply 111 system. A microcontroller 500 connected to the expansion base subsystem 117 provides the intelligence for control of a dual digital potentiometer ("pot") 204 over lines 202. The pot 204 is an integral part of the managed power supply 406.

The pot 204 in the presently preferred embodiment, is a DS1803-100 addressable device with two independently-controlled digital potentiometers, available from Dallas Semiconductor. Device control is achieved via a bi-directional 2-wire serial interface consisting of a data I/O terminal and a clock input terminal.

An optical reference voltage feedthrough 130 provides an optically-isolated feedback connection from the output of the output rectifier/filter 124 to the PWM controller 126

(e.g., a Unitrode UC1842). The PWM controller 126 drives the transformer switch 128 which switches the primary side of isolation transformer 122. In a like manner, optical switch 132 provides an optically-isolated feedback connection from the output of the output rectifier/filter 124 to the PWM controller 126 and an optically-isolated connection from the secondary-side power switch 134 to the primary-side PWM controller 126. Optical reference voltage feedthrough 130 is an analog device for continuous regulation of voltage while optical switch 132 is a digital device operating in conjunction with discrete signals received from the power switch 134.

A change in voltage at the output of output rectifier/filter 124 changes the optical relationship between an emitter-detector pair in optical reference voltage feedthrough 130 and transmits this change to PWM controller 126. The PWM controller 126 reacts accordingly to the voltage level supplied on line 141. If there is no variance in the load voltage along DC output lines 121, PWM controller 126 will maintain the duration of output pulses 129 on line 127 to transformer switch 128. The switching of transformer switch 128 will be of sufficient duration and frequency to allow charge to build on the secondary side of isolation transformer 122. On the other hand, if a variance in the load voltage is detected, the PWM controller 126 will change the duration of output pulses 129 on line 127 to compensate for the voltage variance at DC output lines 121.

Also located on the secondary side of the main power supply 111 is a conventionally designed, low voltage power switch 134 movable between a first, or "ON" position, and a second, or "STANDBY" position. In the "ON" position, the main power supply 111 delivers electrical power to the energy-demanding components of system 112'. In "STANDBY", the main power supply 111 delivers electrical power to the optical switch 132, but not to the energy-demanding components of system 112'.

Figure 2B:
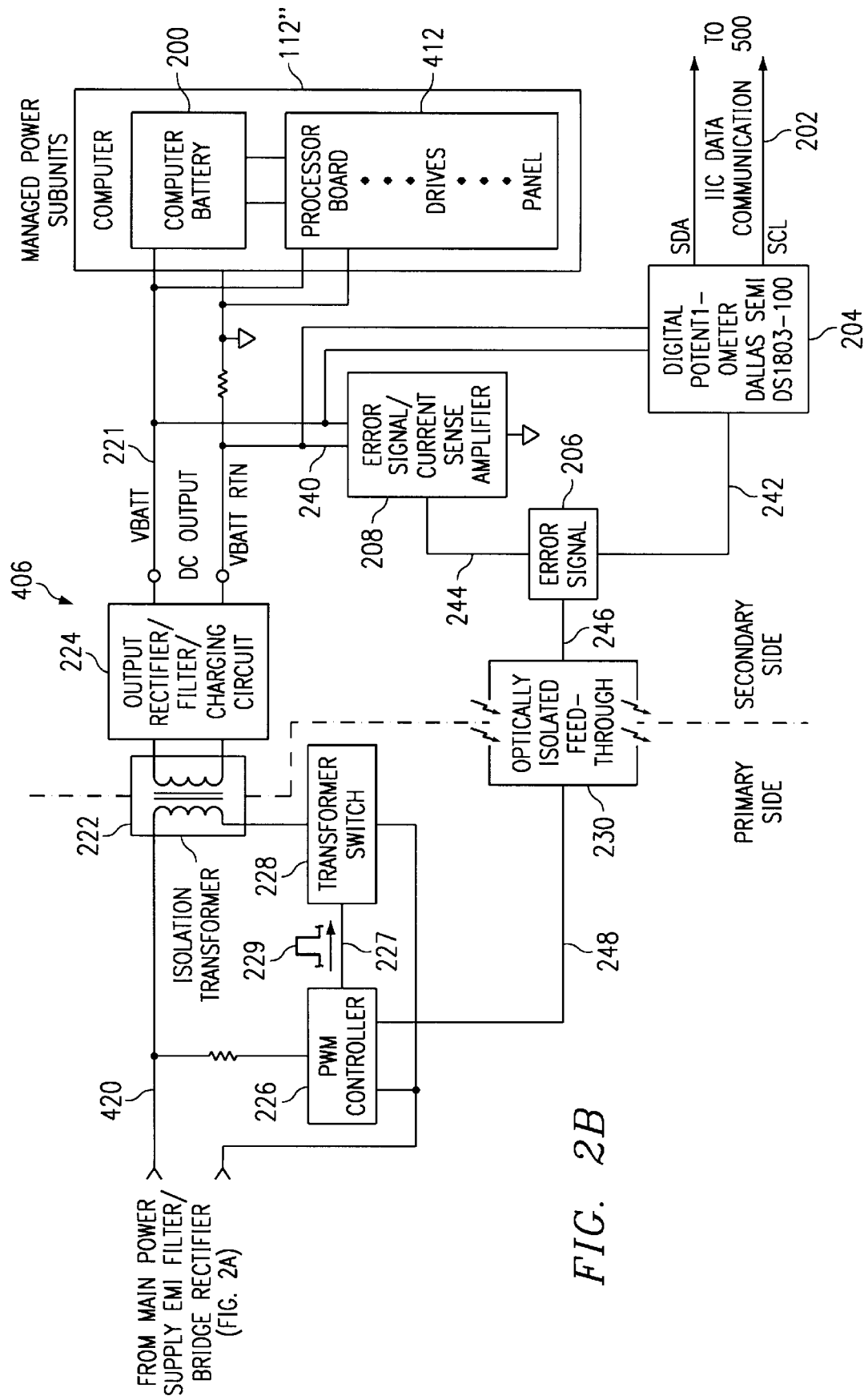
FIG. 2B shows the managed power supply general block diagram with connection to a computer and managed power subunits.

FIG. 2B illustrates a configuration of the managed power supply 406 in relation to managed power subunits 112" contained within system 112 in FIG. 1.

The primary-side circuit configuration is similar to that of FIG. 2A. In this particular embodiment the optical switch 132 (FIG. 2A) is not present. Input 420 carries full-wave-rectified power from the bridge rectifier/filter 120 in FIG. 2A. This power input 420 is connected to the primary of isolation transformer 222 which is switched by transformer switch 228. The transformer switch 228 is controlled by the PWM controller 226.

The secondary-side circuit includes a preferred embodiment of the innovative circuitry and is significantly different from that of the main power supply 111 of FIG. 2A. DC voltage from the output rectifier/filter/charging circuit 224 is carried over DC output lines 221 to the computer 412 and computer battery 200 of the managed power subunits 112".

Expansion base subsystem 117 (FIG. 2A) includes a microcontroller 500 which interfaces with a pot 204 over lines 202. The microcontroller 500, in response to the current level changes at DC output lines 221, signals pot 204 to change the output voltage on line 242 to error signal circuitry 206. The signal from pot 204 functions as a control voltage to error signal circuitry 206.

Both the error signal/current sense amplifier ("sensing") circuitry 208 and the pot 204 are connected to DC output lines 221. The sensing circuitry 208 monitors the current at DC output lines 221 and provides an error signal to error signal circuitry 206 over line 244. The pot 204 is coupled to error signal circuitry 206 over line 242. The pot 204 also monitors the DC voltage at DC output lines 221. Error signal circuitry 206 reacts to the voltage differential between lines 242 and 244 and signals optical reference voltage feedthrough 230 by way of line 246. A signal on line 246 from error signal circuitry 206 changes the optical relationship between an emitter-detector pair in optical reference voltage feedthrough 230 which then transmits this change to PWM controller 226. PWM controller 226 reacts accordingly to the voltage level supplied on line 248. If it determines that there is no variance in the load voltage along DC output lines 221, PWM controller 226 will maintain the duration of output pulses 229 on line 227 to transformer switch 228. The switching of transformer switch 228 will be of duration and frequency to allow sufficient charge to build on the secondary side of isolation transformer 222. On the other hand, if a variance is detected, PWM controller 226 will change the duration of output pulses 229 on line 227 to compensate for the voltage variance at DC output lines 221. The power applied to computer battery 200 from output rectifier/filter/charging circuit 224 will be controlled so as not to exceed manufacturer's specifications.

A shift in the feedback loop causes the voltage and power outputs on lines 221 to change. In a first mode, the available power is 50 W, at a target voltage of 14.1 volts. In a second mode, the available power is 40 W, at a target voltage of 18.85 volts. This permits optimal battery charging, without adding an additional regulator stage to the battery charging circuitry, while still permitting the power needs of the computer itself to be easily met.

Figure 5A:
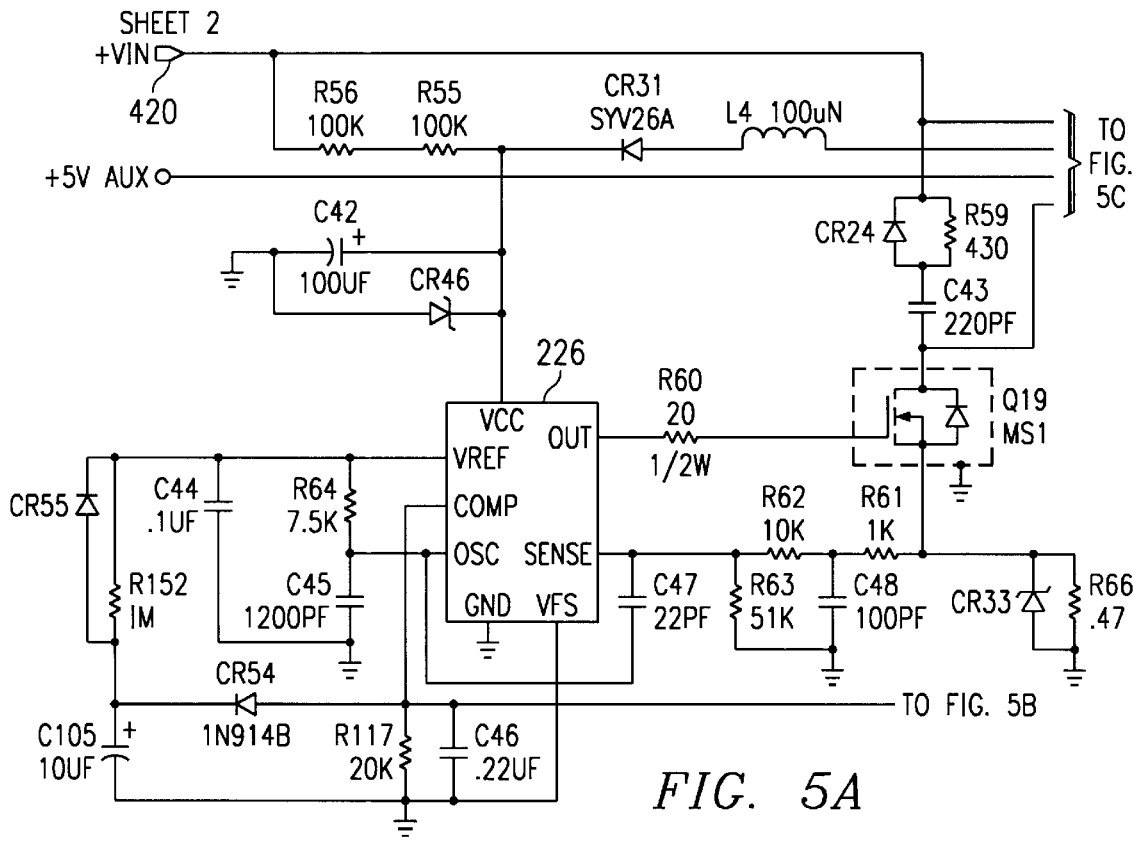
FIGS. 5A–5C are three parts of a single detailed circuit diagram of the managed power supply portion of the charging module.
Figure 5B:
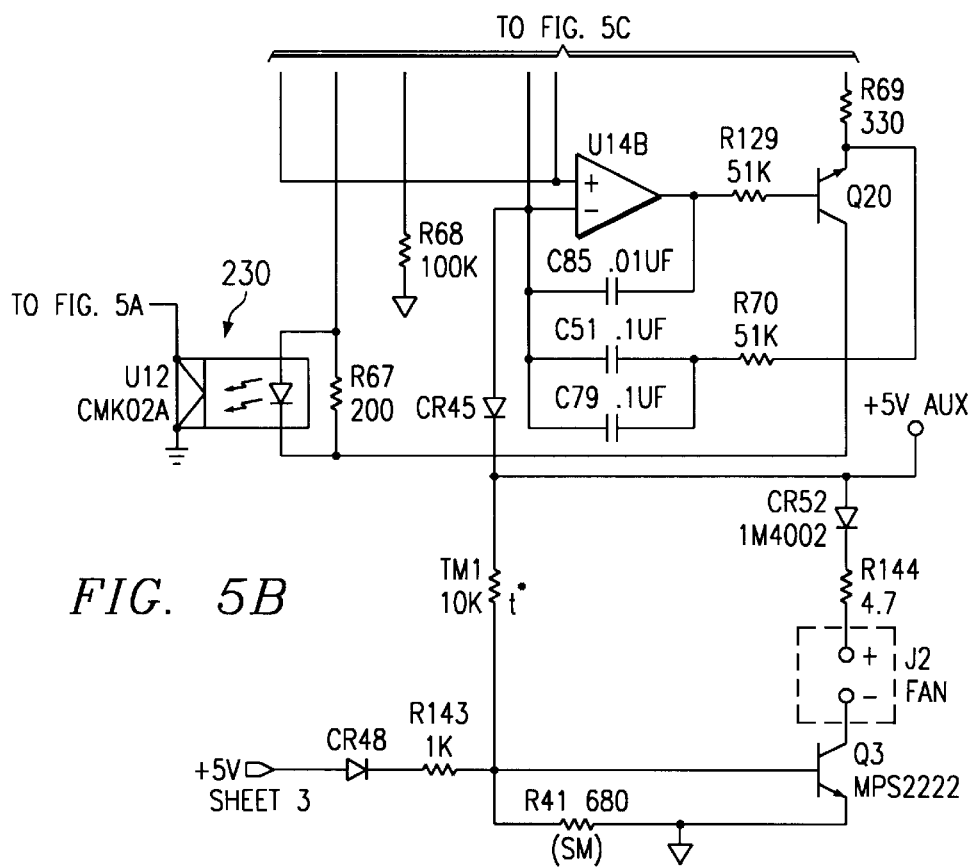
Figure 5C:
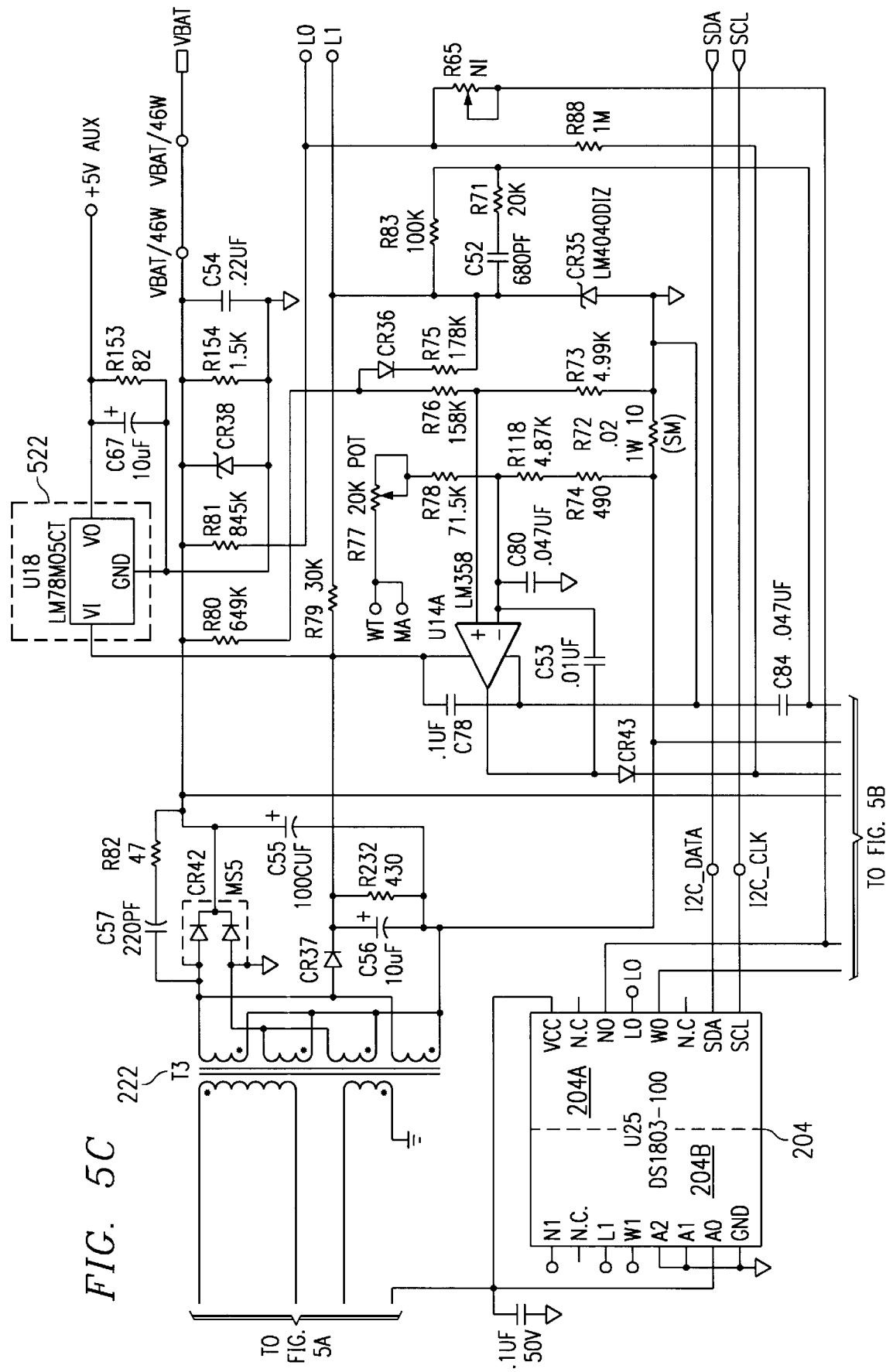

FIGS. 5A–5C are three parts of a single detailed circuit diagram of the managed power supply. The basic blocks were discussed earlier with reference to FIG. 2B and are discussed here in greater detail. AC voltage is received by the managed power supply over line 420 to the primary winding of an isolation transformer 222. AC voltage is stepped-down and coupled to a rectifier/filter/charging circuit 224 and output at a battery voltage terminal VBAT.

When, for example, a portable computer is docked and connected to a docking station, the battery, under normal circumstances, will require charging. Initially, the charging current quickly ramps up to a certain level and decreases over time as the battery accumulates charge. As the voltage at node VBAT drops in response to the increased current demand of the battery, the voltage drop effects the voltage reference signal coupled to the PWM controller 226 via the optical reference voltage feed-through circuit 230.

The PWM controller 226, in the presently preferred embodiment, is implemented with a Linear Technologies, Inc., LT1241 high speed current mode PWM. The oscillator frequency is set by resistor R64 and capacitor C45. The output of the PWM controller 226 drives an enhancement mode power MOSFET device Q19 as a switch for switching the primary side of the isolation transformer 222. The reference input of the PWM controller 226 is obtained through feedthrough 230.

To implement the selectable power conversion described in FIG. 3, a digital potentiometer 204 is used, in the presently preferred embodiment. The microcontroller 500 (which in this embodiment is an 8051 incorporated into the docking station) interfaces with a digital potentiometer ("pot") 204 for monitor and control of the charging voltage and power applied to the battery located within a portable computer.

The pot 204, in the presently preferred embodiment, comprises two independently digitally-controlled 256-position potentiometers, 204A and 204B. Communication is via a IIC communication link from the microcontroller 500 to the pot 204. Data is presented at the data terminal SDA and clock signals are presented at the clock signal terminal SCL. Each potentiometer contained in pot 204 has a wiper terminal (W0 or W1), the position of which can be accurately read or written by the microcontroller 500.

A dual control loop (for voltage and current) is implemented using op amps U14A and U14B. Op amp U14A gets a current-dependent voltage on its upper terminal (in the orientation shown). Resistor R72 (which in this embodiment is a 20 milliohm resistor rated at 1 W) provides current sensing. The lower terminal of U14A (in the orientation shown) is connected, through a voltage divider, to the terminals W1 and H1 of the pot 204B. (Thus pot 204B is being used merely as a programmable resistor.) The other terminal L1 of pot 204B receives a fixed voltage from Zener CR35.

The op amp U14B provides a voltage control loop: the upper input of U14B (in the orientation shown) is connected to wiper terminal W0 of pot 204A. Terminal H0 of pot 204A is connected through a resistor to ground, and the third terminal L0 of pot 512A is connected to the connection shown on the right side of the Figure. (Preferably U14A and U14B are both implemented by a LM358 dual op-amp chip.) The outputs of U14A and U14B are combined using diode CR43, and a single error signal is provided to optical feedthrough 230.

Preferably a small voltage regulator 522 provides regulated power outputs to the chips shown.

The pot 204 is programmed through the serial interface lines, as described above, to shift the voltage and current setpoints when needed.

Figure 6:
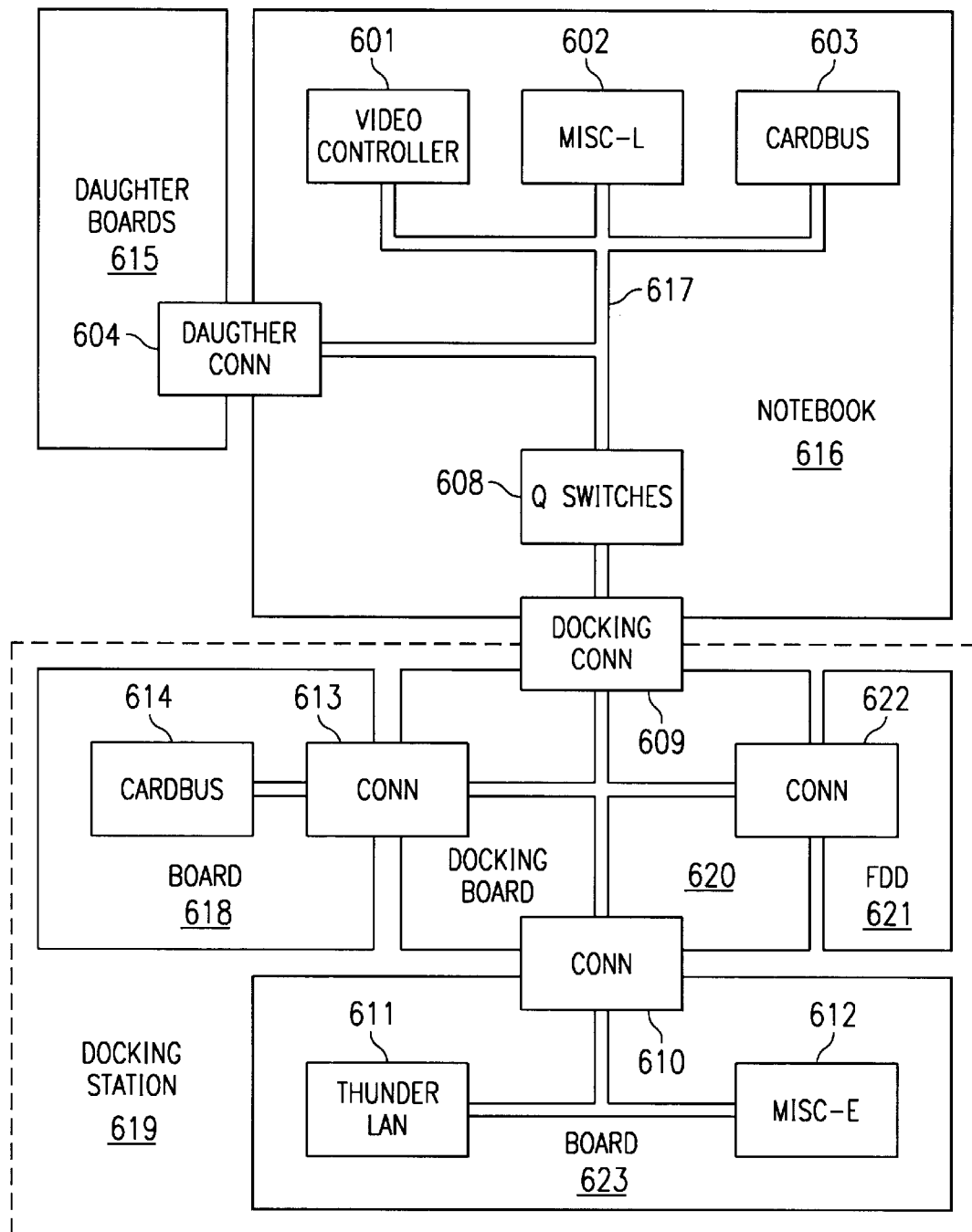
FIG. 6 shows a high-level block diagram of a notebook computer and associated bus interconnections when connected to a docking station.

FIG. 6 shows a high-level block diagram of a docked notebook computer 465 and associated bus interconnections 617. Communications and power are coupled between the computer 616 and the docking station 619 through a docking connector 609.

The notebook computer 616 devices include a video controller circuit 601, a PCMCIA ("cardbus") interface circuit 603, an on-board power system 602, and interconnectivity between the above systems over an interface bus 617. Additionally, any daughter-boards 615 providing further functionality may be connected to the notebook computer 616 through a daughterboard connector 604. In order for the docking station 619 and notebook computer 616 system to communicate, Q switches 608 sense when proper docking has taken place and provide an indication to the notebook 616.

The docking station 619 has many slots which provide accommodations for adding several peripheral components to enhance the functionality of the station. For example, a LAN interface circuit 611 offers connectivity to a local area network and a local power system 612 provides power to the notebook 616 when docked in the station 619. When the notebook 616 is not docked, power system 602, integral to the notebook 616, supplies the needed power. A floppy disk drive ("FDD") 621 can be inserted into a spare slot of the docking station 619. Connectivity to the docking board 620 through an interface connection 622 ultimately provides access to a FDD 621 for notebook computers 616 that may not have that functionality in an initial design.

The central docking board 620 provides the interfacing function for all peripheral components installed into the docking station 619. Board 623 accommodates the LAN interface circuit 611 and the local power system 612 and is removable such that other peripherals that are compatible with that slot may be inserted and used. Board 618 accommodates cardbus functionality for the docking station 619 and connection is made through connection 613. This board 618 may be removed and a battery pack inserted into this slot for charging or backup purposes related to powering the docking station 619.

It is conceivable that all peripheral slots can be designed to accommodate a wide variety of peripherals which are interchangeable with all other slots of the docking station and notebook.

Physical Configuration of Docking Station

Figure 4A:
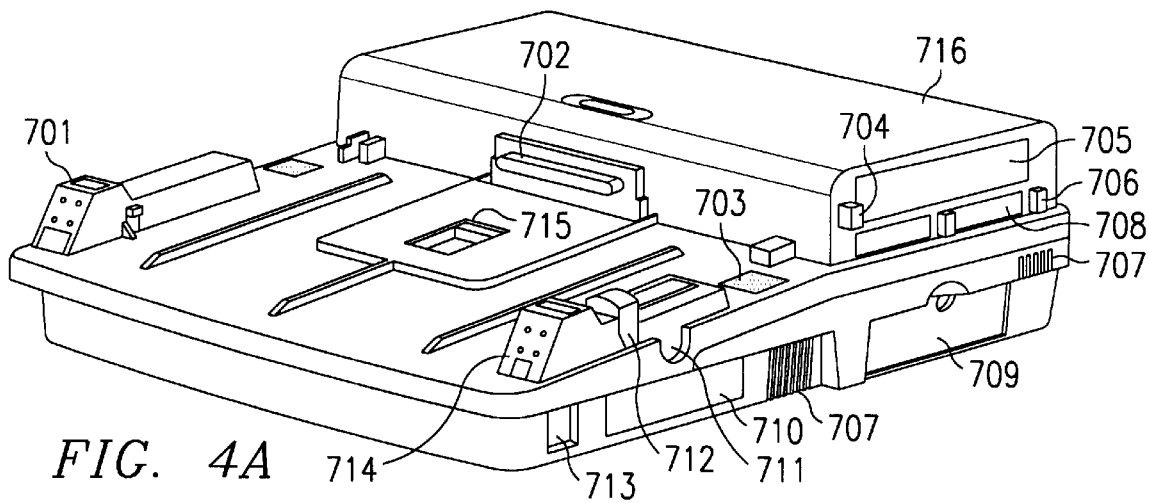
FIGS. 4A and 4B show the physical appearance of a sample docking station implementation of the system of FIG. 1.

FIG. 4A shows the physical configuration of a sample embodiment of a typical computer docking station, incorporating many of the features previously mentioned. When the computer is inserted into the docking station 716 provisions are made to support the display through monitor support slots 701. Connectivity from a notebook computer to the docking station 716 is through a docking station interface connector 702. Stereo speakers 703 and 710 offer multimedia support. Peripheral slots 705 and 709 accommodate compatible peripherals such as battery packs, harddrives, and floppy disk drives. Peripherals in slot 705 may be ejected by release button 704. Slots 708 accommodate cardbus devices which may be ejected with cardbus release buttons 706. For enhanced multimedia support, an audio port 713 allows for bass support. A security cable slot 712 provides for securing of the docking station to a support. A docking lever 712 connected to a docking hook 715 latches the notebook computer into the docking station 716 for stable use.

Figure 4B:
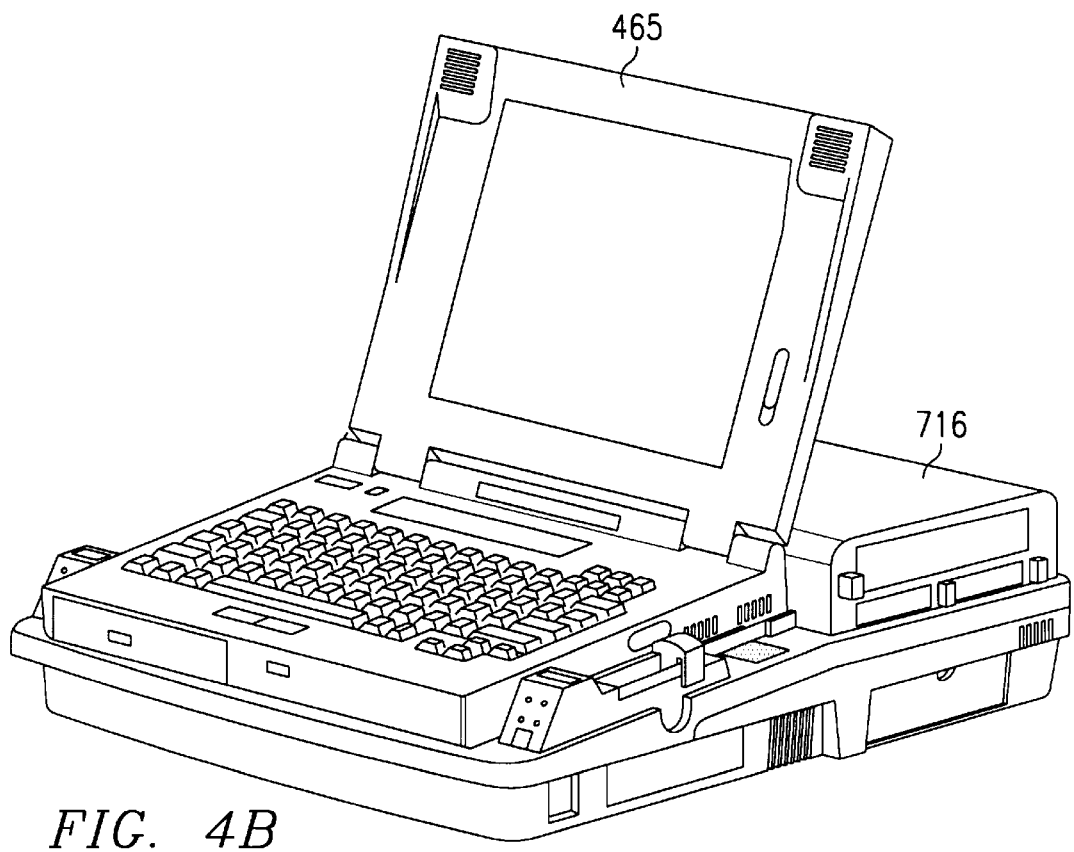

FIG. 4B shows the docking station 716 of FIG. 4A with a computer 465 docked in the station.

According to one innovative embodiment, there is provided a method for powering a portable electronic appliance and/or recharging a rechargeable battery, comprising the steps of if the appliance is drawing power, performing conversion of AC power to provide a DC power supply output at a first voltage level and at a first maximum power level; and if the appliance is not drawing power and if the battery is being recharged, performing conversion of AC power to provide said DC power supply output at a second voltage level which is different from said first voltage level and a second maximum power level which is different from said first maximum power level.

According to another innovative embodiment, there is provided a method for powering a portable computer docking station which can receive and provide power to both a portable computer and a rechargeable battery, comprising the steps of if the computer is docked and actively operating, performing conversion of AC power to provide a first DC output voltage level which is shared by both the computer and the battery, at a first maximum power level; and if the battery is being recharged and the computer is not actively operating, performing conversion of AC power to provide a second DC output voltage level which is different from said first DC output voltage level, at a second maximum power level which is different from said first maximum power level.

According to another innovative embodiment, there is provided a portable computer docking subsystem, comprising a power supply comprising an AC power conversion circuit that in a first mode provides a first DC output voltage level and a first maximum power level; and in a second mode provides a second DC output voltage and a second maximum power level which is different from said first power level; and a plurality of slots comprising connections to said power supply for receiving power.

According to another innovative embodiment, there is provided a portable computer system, comprising a computer, comprising memory and a programmable processor, integrated in a common portable chassis; at least one rechargeable battery attachable to said chassis, and electrically connected to power said processor under at least some circumstances; and a power conversion circuit, connectable to an AC power outlet, for providing one or more power supply outputs to said processor and said battery, at a first voltage level and a first maximum power level, if the computer is drawing power, and at a second voltage level which is different from said first voltage level and a second maximum power level which is different from said first maximum power level, if the appliance is not drawing power and if the battery is being recharged.

According to another innovative embodiment, there is provided a portable computer system, comprising a computer, comprising memory and a programmable processor, integrated in a common portable chassis; at least one rechargeable battery attachable to said chassis, and electrically connected to power said processor under at least some circumstances; and power conversion means, connectable to an AC power outlet, for providing one or more power supply outputs to said processor and said battery, at a first voltage level and a first maximum power level, if the computer is drawing power, and at a second voltage level which is different from said first voltage level and a second maximum power level which is different from said first maximum power level, if the appliance is not drawing power and if the battery is being recharged.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

For example, other circuit expedients can be used to shift the output voltage and output power ratings.

For another example, the present invention can also be applied to provide more than two modes of operation.

For another example, the present invention can also be applied to a portable computer alone (although application to a docking station appears to be particularly advantageous).

For another example, the use of a main power supply in addition to the managed power supply is not strictly necessary. Alternatively, the system can include only a managed power supply, or multiple separately managed power supplies.

For another example, a variety of converter topologies can be used with the present invention if desired.

As shown in the figures, the presently preferred embodiment includes a secondary-side power-control switch, as described in U.S. application Ser. No. 08/527,765 filed Sep. 13, 1995 (P-715), which is hereby incorporated by reference. However, of course other power switch architectures can be used as well.

What is claimed is:

1. A method for powering a portable electronic appliance and/or recharging a rechargeable battery, comprising the steps of:

(a.) if the appliance is drawing power; performing conversion of AC power to provide a DC power supply output at a first voltage level and at a first maximum power level; and (b.) if the appliance is not drawing power and if the battery is being recharged, performing conversion of AC power to provide said DC power supply output at a second voltage level which is different from said first voltage level and a second maximum power level which is different from said first maximum power level.

2. The method according to claim 1, wherein said portable appliance is a computer.

3. The method according to claim 1, wherein said portable appliance is a computer, and said step of performing conversion is performed by a docking station which mates with said computer.

4. The method according to claim 1, wherein said step of performing conversion is performed within said appliance.

5. The method according to claim 1, wherein said circuit for converting power comprises a digital potentiometer that communicates with a microcontroller.

6. The method according to claim 1, wherein said first maximum power level is higher than said second maximum power level, and said first voltage level is lower than said second voltage level.

7. The method according to claim 1, wherein said first power level is 50 W and said first voltage level is 14.1 VDC.

8. The method according to claim 1, wherein said second power level is 40 W and said second voltage level is 18.85 VDC.

9. A method for powering a portable computer docking station which can receive and provide power to both a portable computer and a rechargeable battery, comprising the steps of:

(a.) if the computer is docked and actively operating, performing conversion of AC power to provide a first DC output voltage level which is shared by both the computer and the battery, at a first maximum power level; and (b.) if the battery is being recharged and the computer is not actively operating, performing conversion of AC power to provide a second DC output voltage level which is different from said first DC output voltage level, at a second maximum power level which is different from said first maximum power level.

10. The method according to claim 9, wherein said portable computer docking station comprises a microcontroller which communicates with a digital potentiometer.

11. The method according to claim 9, wherein said first maximum power level is 50 W and said first DC output voltage level is 14.1 VDC.

12. The method according to claim 9, wherein said second maximum power level is 40 W and said second DC output voltage level is 18.85 VDC.

13. The method according to claim 9, wherein said first DC output voltage level is fed back to a circuitry on a primary side of an isolation transformer.

14. The method according to claim 9, wherein said first DC output voltage is coupled to a sensing circuit which generates an error signal.

15. The method according to claim 9, wherein said second DC output voltage is coupled to a digital potentiometer; said digital potentiometer operatively connected to a microcontroller for bi-directional communication of a digital representation of said second DC output voltage.

16. A portable computer docking subsystem, comprising: a power supply comprising an AC power conversion circuit that in a first mode provides a first DC output voltage level and a first maximum power level; and in a second mode provides a second DC output voltage and a second maximum power level which is different from said first power level; and a plurality of slots comprising connections to said power supply for receiving power.

17. The subsystem according to claim 16, wherein said AC power conversion circuit comprises a feedback loop from a secondary side of an isolation transformer to a primary side of said isolation transformer.

18. The subsystem according to claim 16, wherein said AC power conversion circuit comprises a digital potentiometer which communicates with a microcontroller.

19. The subsystem according to claim 16, wherein said first DC output voltage is coupled to a sensing circuit which generates an error signal.

20. The subsystem according to claim 16, wherein said first maximum power level is 50 W and said first DC output voltage level is 14.1 VDC.

21. The subsystem according to claim 16, wherein said second maximum power level is 40 W and said second DC output voltage level is 18.85 VDC.

22. A portable computer system, comprising:

a computer, comprising memory and a programmable processor, integrated in a common portable chassis;

at least one rechargeable battery attachable to said chassis, and electrically connected to power said processor under at least some circumstances; and a power conversion circuit, connectable to an AC power outlet, for providing one or more power supply outputs to said processor and said battery, at a first voltage level and a first maximum power level, if the computer is drawing power, and at a second voltage level which is different from said first voltage level and a second maximum power level which is different from said first maximum power level, if the appliance is not drawing power and if the battery is being recharged.

23. The system according to claim 22, wherein said power conversion circuit comprises a microcontroller operatively connected to control a digital potentiometer.

24. The system according to claim 22, wherein said power conversion circuit comprises an isolation transformer that is switchable on a primary side.

25. The system according to claim 22, wherein said power conversion circuit comprises a current sensing circuit operatively connected to a digital potentiometer.

26. The system according to claim 22, wherein said power conversion circuit comprises a feedback loop from a secondary side of an isolation transformer to a primary side of said isolation transformer.

27. The system according to claim 22, wherein said first power level is 50 W and said first voltage level is 14.1 VDC.

28. The system according to claim 22, wherein said second power level is 40 W and said second voltage level is 18.85 VDC.

29. A portable computer system, comprising:

a computer, comprising memory and a programmable processor, integrated in a common portable chassis;

at least one rechargeable battery attachable to said chassis, and electrically connected to power said processor under at least some circumstances; and power conversion means, connectable to an AC power outlet, for providing one or more power supply outputs to said processor and said battery, at a first voltage level and a first maximum power level, if the computer is drawing power, and at a second voltage level which is different from said first voltage level and a second maximum power level which is different from said first maximum power level, if the appliance is not drawing power and if the battery is being recharged.

30. The system according to claim 29, wherein said means for converting power comprises a microcontroller which communicates with a digital potentiometer.

31. The system according to claim 29, wherein said means for converting power comprises an isolation transformer that is switchable on a primary side.

32. The system according to claim 29, wherein said means for converting power comprises a current sensing circuit operatively connected to a digital potentiometer.

33. The system according to claim 29, wherein said means for converting power comprises a feedback loop from a secondary side of an isolation transformer to a primary side of said isolation transformer.

34. The system according to claim 29, wherein said first power level is 50 W and said first voltage level is 14.1 VDC.

35. The system according to claim 29, wherein said second power level is 40 W and said second voltage level is 18.85 VDC.

\* \* \* \* \*